(12) United States Patent
Muramatsu

(10) Patent No.: US 6,714,734 B2
(45) Date of Patent: Mar. 30, 2004

(54) CAMERA

(75) Inventor: Masaru Muramatsu, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/262,903

(22) Filed: Oct. 3, 2002

(65) Prior Publication Data

US 2003/0063907 A1 Apr. 3, 2003

(30) Foreign Application Priority Data

Oct. 3, 2001 (JP) ........................................ 2001-307625

(51) Int. Cl.[7] ................................................ G03B 15/05
(52) U.S. Cl. ...................................................... 396/157
(58) Field of Search ........................................ 396/157

(56) References Cited

U.S. PATENT DOCUMENTS 6,240,252 B1 * 5/2001 Yamaguchi et al. .... 396/157 X
6,272,292 B1 * 8/2001 Iwasaki et al. ............. 396/157
6,560,412 B2 * 5/2003 Iwasaki ....................... 396/157

FOREIGN PATENT DOCUMENTS

| EP | 0 949 809 A2 | 10/1999 | .......... H04N/5/235 |
| JP | A 9-54352 | 2/1997 | ............ G03B/7/16 |
| JP | A 11-298793 | 10/1999 | .......... H04N/5/238 |

* cited by examiner

Primary Examiner—W. B. Perkey
(74) Attorney, Agent, or Firm—Oliff & Berridge

(57) ABSTRACT

A camera comprises a storage-type photometering sensor that detects some of light from a subject; a control device that controls an auxiliary illumination device so as to perform a preliminary light emission through a single-shot light emission and controls the storage-type photometering sensor so as to detect the subject light stored over a storage period matching a length of time over which light is emitted during the preliminary light emission; and a setting device that sets a light emission condition under which the auxiliary illumination device is to emit light during a flash photographing operation based upon detection results obtained at the storage-type photometering sensor.

8 Claims, 5 Drawing Sheets

CAMERA

INCORPORATION BY REFERENCE

The disclosure of the following priority application is herein incorporated by reference:

Japanese Patent Application No. 2001-307625 filed Oct. 3, 2001.

BACKGROUND OF THE INVENTION

1. Field of the Invention

The present invention relates to a camera that performs a flash photographing operation by utilizing an auxiliary illumination device.

2. Description of the Related Art

In a camera that performs a photographing operation by employing an auxiliary illumination device such as an electronic flash unit in the related art, a flash control system that determines the correct flash output to be achieved during a main light emission by executing a preliminary light emission prior to the main light emission as disclosed in, for instance, Japanese Laid-Open Patent Publication No. H 9-53452 is adopted. The preliminary light emission is executed through a so-called focal plane light emission during which a light emission is sustained over a predetermined length of time with an almost constant intensity by repeatedly turning the flash unit on and off at high speed. Then, the quantity of light reflected from the subject is detected through a method similar to that adopted when measuring the ambient light and the correct flash light output to be achieved during the photographing operation is determined based upon the results of the detection.

During a preliminary light emission achieved through a continuous light emission as described above, light is emitted by dividing up the light emission energy achieved through a single charge at the capacitor and thus using the light emission energy over a plurality of times and, for this reason, the intensity level of the light emitted through each light emission is lowered. As a result, if the brightness level of the ambient light is high or if the distance to the subject is great, the quantity of reflected light resulting from the preliminary light emission becomes lower than the quantity of the reflected ambient light, which makes it difficult to detect the quantity of the reflected light resulting from the preliminary light emission

SUMMARY OF THE INVENTION

The present invention is to provide a camera capable of accurately determining the correct flash output to be achieved during a flash photographing operation by reducing the influence of the ambient light.

A camera according to the present invention comprises a storage-type photometering sensor that detects some of light from a subject; a control device that controls an auxiliary illumination device so as to perform a preliminary light emission through a single-shot light emission and controls the storage-type photometering sensor so as to detect the subject light stored over a storage period matching a length of time over which light is emitted during the preliminary light emission; and a setting device that sets a light emission condition under which the auxiliary illumination device is to emit light during a flash photographing operation based upon detection results obtained at the storage-type photometering sensor.

It is preferable that the camera further comprises a decision-making device that makes a decision whether a detection value obtained at the storage-type photometering sensor through the preliminary light emission is equal to or smaller than a predetermined value, and that if the detection value is determined to be equal to or smaller than the predetermined value by the decision-making device, (a) the control device controls the auxiliary illumination device so as to execute an additional preliminary light emission with a greater flash output than in the preliminary light emission and controls the storage-type photometering sensor so as to detect subject light stored over a storage time matching a length of time over which light is emitted during the additional preliminary light emission and (b) the setting device sets the light emission condition under which the auxiliary illumination device is to emit light for the flash photographing operation based upon detection results obtained at the storage-type photometering sensor during the additional preliminary light emission.

It is desirable that the detection value obtained at the storage-type photometering sensor represents a received light quantity with regard to reflected light from the subject attributable to the light emitted through the preliminary light emission. The received light quantity with regard to the reflected light from the subject attributable to the light emitted through the preliminary light emission may be obtained by eliminating reflected light from the subject attributable to ambient light from the detection results obtained at the storage-type photometering sensor.

It is possible that the setting device sets the light emission condition under which the auxiliary illumination device is to emit light during the flash photographing operation based upon the predetermined value if the detection value obtained by the storage-type photometering sensor through the additional preliminary light emission is determined to be equal to or smaller than the predetermined value by the decision-making device.

It is preferable that the setting device allows the auxiliary illumination device to execute the preliminary light emission when a shutter release switch is pressed. It is possible that the camera further comprises a command switch that outputs a command for an execution of the preliminary light emission, and that the setting device allows the auxiliary illumination device to execute the preliminary light emission when the command is output through the command switch.

It is preferable that the storage-type photometering sensor detects some of the subject light guided to a view finder optical system.

DESCRIPTION OF THE PREFERRED EMBODIMENT

The following is an explanation of an embodiment of the present invention given in reference to the drawings.

Figure 1:
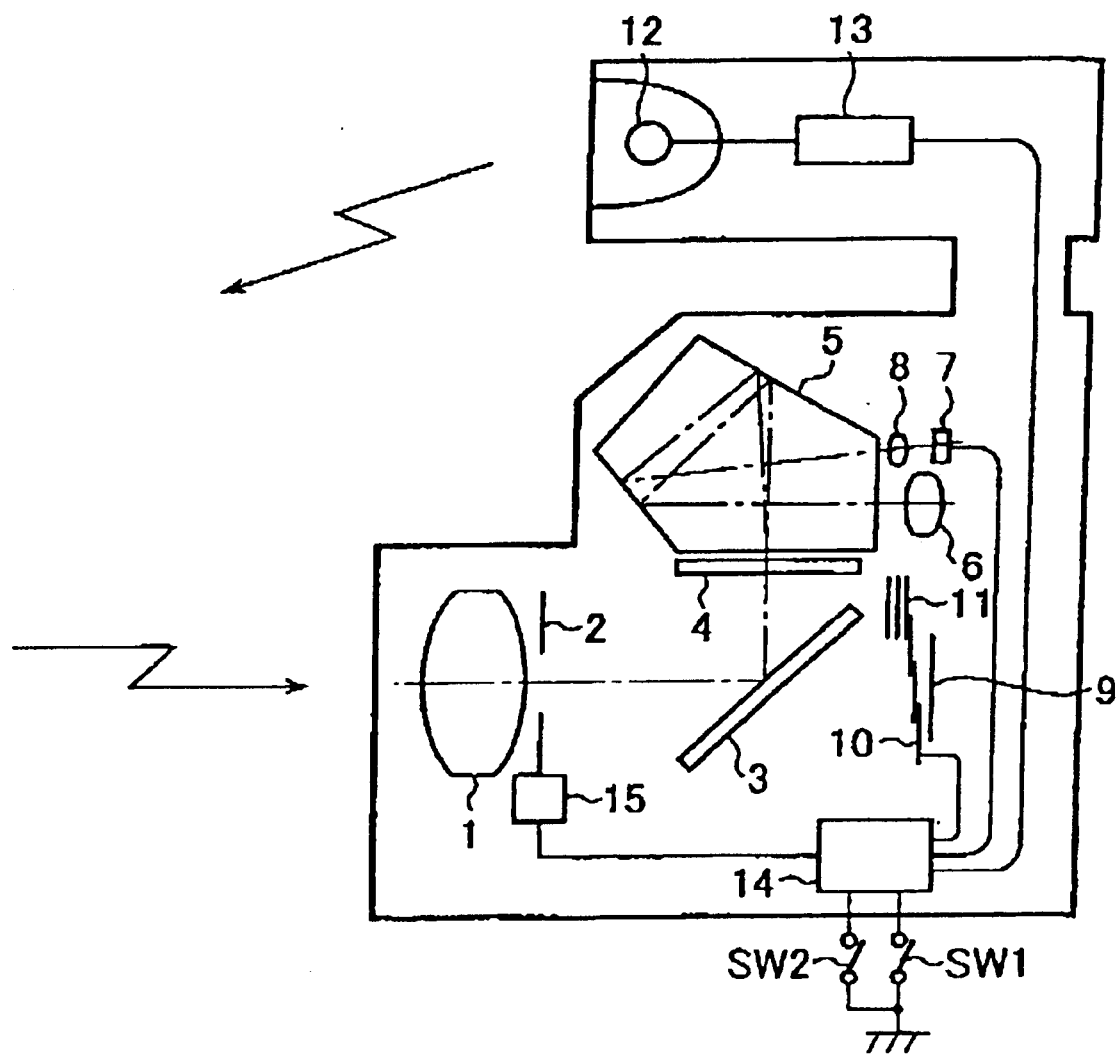
FIG. 1 is a schematic block diagram of the camera according to the present invention.

FIG. 1 schematically illustrates the structure adopted in the camera according to the present invention. As shown in FIG. 1, light from a subject exiting a photographic lens 1 passes through an aperture 2 and reaches a quick-return mirror 3. The quick-return mirror 3, which is in a non-photographing state in FIG. 1, reflects the subject light toward a focusing plate 4. Part of the subject light exiting the focusing plate 4 is guided to a CCD sensor 7 via a pentaprism 5 and an image-forming lens 8, whereas the remaining light is guided to a view finder optical system 6 via the pentaprism 5. The image-forming lens 8 forms a subject image on the image-capturing surface at the CCD sensor 7.

During a photographing operation, the quick-return mirror 3 is driven out of the photographic light path and the subject image is formed on a film surface 9. A focal plane shutter includes a shutter front curtain 10, a shutter rear curtain 11 and the like. A flash tube 12 at the electronic flash unit, which may be constituted of, for instance, a xenon tube, is driven by a flash tube drive device 13.

A control device 14 in the camera controls the CCD sensor 7, the flash tube drive device 13, an aperture drive device 15, the shutter and the like. The control device 14 includes an arithmetic operation unit that executes arithmetic operations related to flash control as will be explained later and a storage unit in which data are saved. A shutter release switch SW 1 is turned on as a shutter release button (not shown) is pressed down. A switch SW 2 is turned on as a preliminary light emission button (not shown) is pressed down. It is to be noted that the electronic flash unit may be constituted as an integrated part of the camera or it may be constituted as a separate component.

Figure 2:
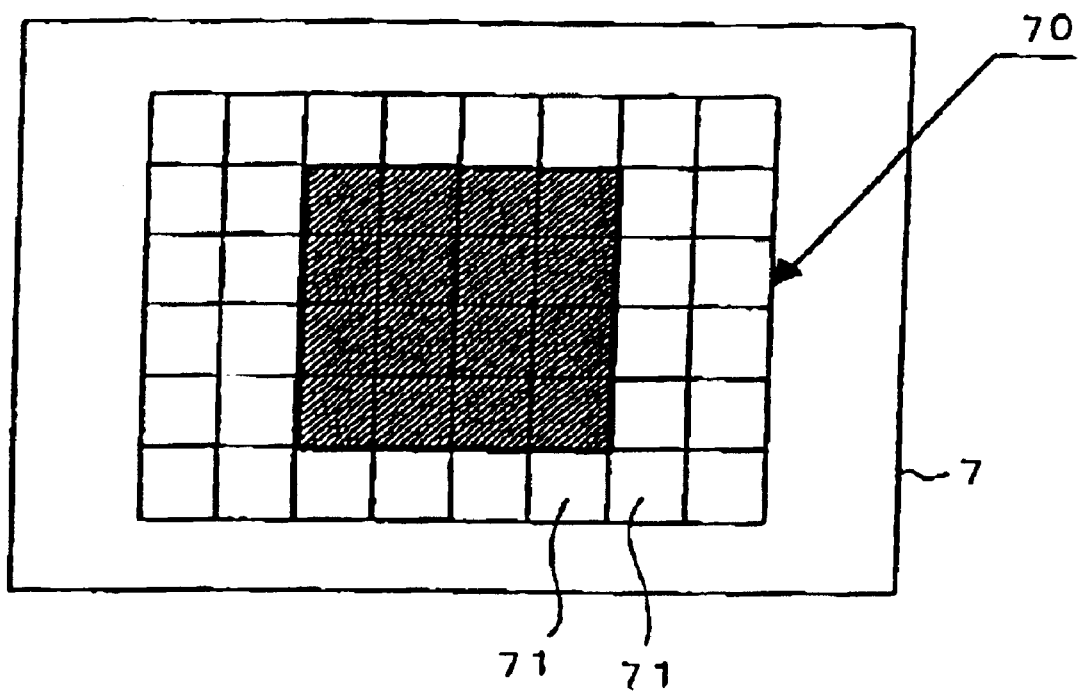
FIG. 2 shows an image-capturing area at the CCD sensor.

FIG. 2 shows an image-capturing area 70 at the CCD sensor 7. A plurality of CCD pixels 71 are two-dimensionally arrayed in the image-capturing area 70. A subject image is projected over the entire image-capturing area 70. In the example presented in FIG. 2, the image-capturing area 70 is constituted of 8×6=48 pixels. When a photometering operation is performed over the central area, the data detected at the 16 hatched pixels at the center of the image-capturing area 70 are utilized in the photometering operation.

In the related art, an SPD (silicon photodiode) or the like is used as a photometering sensor. An SPD sequentially outputs currents, the levels of which correspond to the intensity of the subject light. At the CCD sensor 7, which is a storage-type photoelectric conversion element, an electrical charge in proportion to the quantity of the light originating from the subject having been irradiated over a predetermined length of time is stored and the stored electrical charge is taken out as an output. Thus, even with a small light quantity, a sufficient output to implement flash control can be obtained by increasing the length of irradiation time, i.e., the length of time over which the electrical charge is stored. The following is an explanation of the flash control achieved through central photometering. It is to be noted, however, that the flash control according to the present invention may likewise be adopted in conjunction with multi-split photometering or spot photometering.

Figure 3:
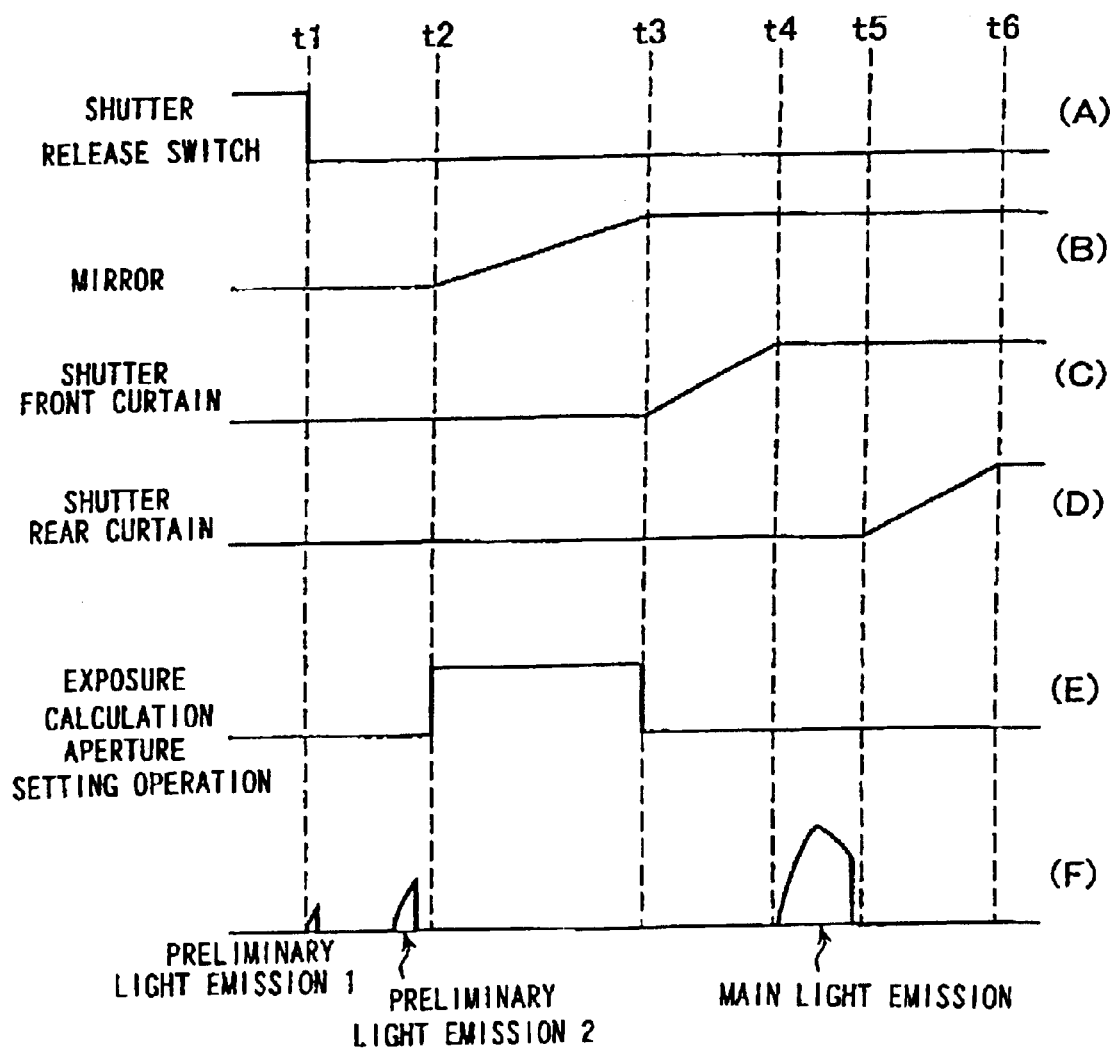
FIG. 3 presents a time chart of the events occurring after the shutter release switch SW 1 is turned on until the main light emission is performed.

FIG. 3 presents a timing chart of the events occurring after the shutter release switch SW 1 in FIG. 1 is turned on until the main light emission is executed. Of the individual operations shown in FIG. 3, (A) represents the on/off operation of the shutter release switch SW 1 with the high level indicating an OFF state and the low level indicating an ON state. (B) represents the up/down operation of the quick-return mirror 3, with the high level indicating a raised state, i.e., a photographing state, and the low level indicating a lowered state, i.e., a non-photographing state. (C) and (D) respectively represent the traveling states of the shutter front curtain 10 and the shutter rear curtain 11, with the low level indicating a pre-travel state and the high level indicating a post travel state. (E) represents the timing with which the exposure calculation and the aperture setting operation are executed, and the high level indicates that the calculation and the aperture setting operation are executed. (F) indicates changes in the intensity of the emitted light during a preliminary light emission and the main light emission.

As the shutter release switch SW 1 is turned on at a time point t1, a preliminary light emission is performed by emitting a single-shot of flash light through the flash control which is to be detailed later. In the embodiment, one or two preliminary light emissions are executed. Namely, only a single preliminary light emission is executed if a sufficient quantity of reflected light is obtained through the first preliminary light emission 1, whereas if the quantity of reflected light obtained through the first preliminary light emission 1 is smaller than a predetermined quantity and thus insufficient, another preliminary light emission 2 is executed to achieve a light quantity larger than the light quantity achieved through the first preliminary light emission. In the example presented in FIG. 3, two preliminary light emissions are executed.

Following the preliminary light emission 1 and the preliminary light emission 2, a mirror-up operation for the quick-return mirror 3 starts at a time point t2 and, at the same time, an exposure calculation and an aperture setting operation to achieve a preset aperture value at the aperture start. As these operations are completed at a time point t3, the shutter front curtain 10 starts to travel. Subsequently, as the shutter front curtain 10 completes its travel at a time point t4, A main light emission is executed based upon the results of the preliminary light emissions. At a time point t5 by which the predetermined length of shutter time has elapsed, the shutter rear curtain 10 starts to travel. After the shutter rear curtain 10 completes its travel at a time point t6, operations such as a film winding up operation, a shutter charged and a mirror-down operation are performed before the sequence of processing ends.

Figure 4:
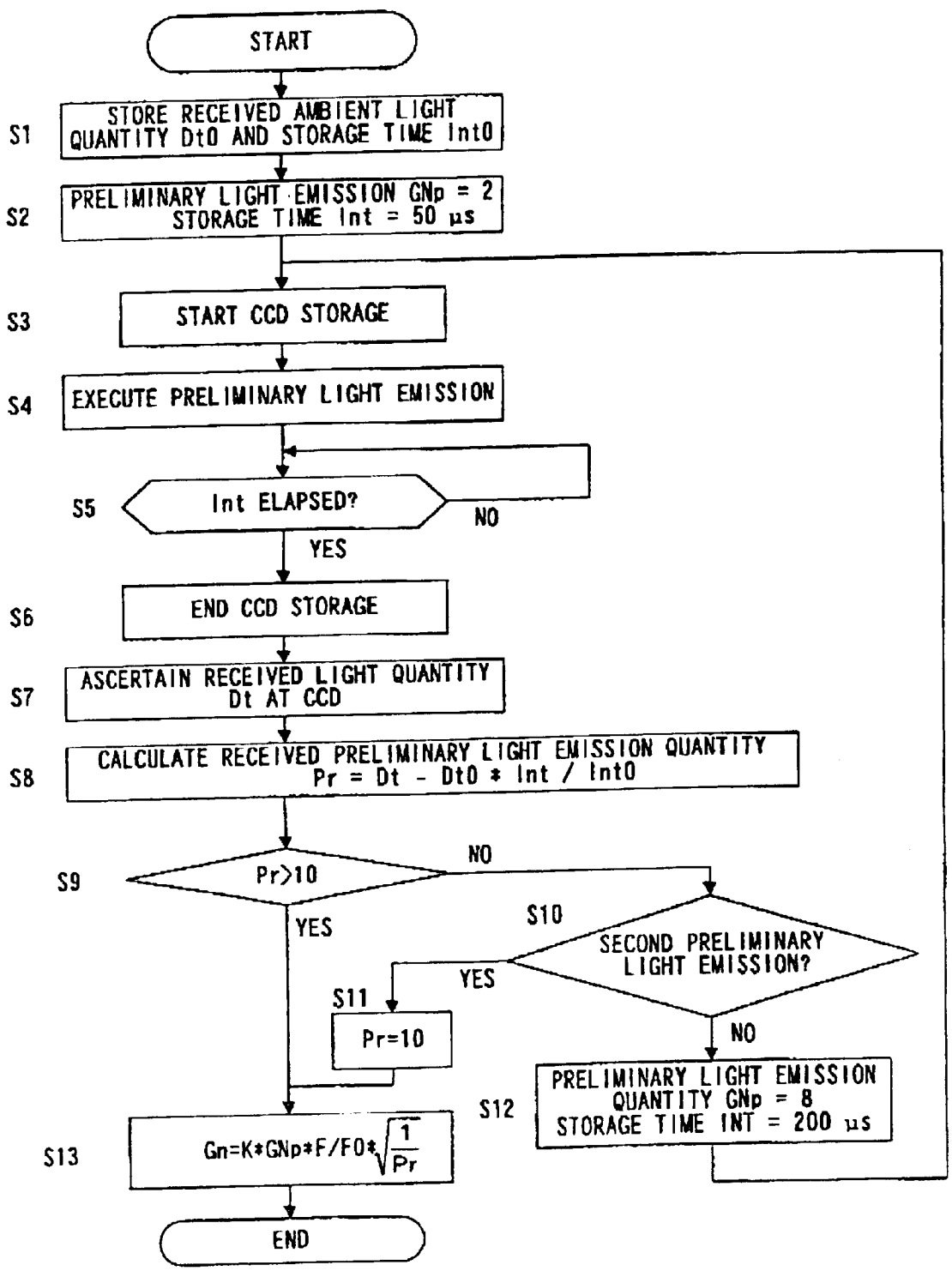
FIG. 4 presents a flowchart of the procedure starting with the preliminary light emission operation and culminating with the calculation of the guide number to be achieved in the main light emission.

Next, the flash control achieved by executing the preliminary light emissions, i.e., the procedure of the processing starting with the preliminary light emission operation and culminating with the calculation of the guide number to be set for the main light emission, is explained in reference to the flowchart presented in FIG. 4. It is to be noted that this processing is executed at the control device 14. The processing in the flowchart in FIG. 4 starts as the shutter release switch SW 1 is turned on. The explanation is given on an assumption that a quantity Dt0 of received ambient light is obtained in advance by detecting the reflected light from the subject illuminated with ambient light such as sunlight or electric lamp light with an ambient light metering sensor. The received ambient light quantity Dt0 should be obtained, for instance, during the period of time elapsing after a halfway press switch (not shown) is pressed down until the shutter release switch SW 1 is turned on.

In step S1, the received ambient light quantity Dt0 and the length of storage time Int0 over which the received ambient light quantity Dt0 was detected are stored into the storage unit in the control device 14.

In step S2, the length of time over which light is to be emitted in the preliminary light emission is set so that the flash output achieved in the preliminary light emission matches a guide number GNp=2. Then, the length of time corresponding to the light emission time is set for the storage time Int at the CCD sensor 7. In this example, the storage time Int is set to 50 μs. In step S3, a storage starts at the CCD sensor 7. In step S4, the preliminary light emission is executed through a flash light emission so as to achieve a flash output matching the guide number GNp which has been set. In step S5, a decision is made as to whether or not the storage time Int=50 μs has elapsed since the storage was started in step S3. If an affirmative decision is made in step S5, the operation proceeds to step S6 to end the storage at the CCD sensor 7.

In step S7, photometering values corresponding to the charges stored at the central area of the CCD sensor 7 and, more specifically, over the hatched area in FIG. 2 are obtained and their average Dt is determined as the quantity of light received during the preliminary light emission. In step S8, a quantity of received light Pr attributable to the preliminary light emission alone is calculated through formula (1) presented below based upon the received ambient light quantity Dt0 and the storage time Int0 obtained in step S1 and the quantity of light Dt recedived during the preliminary light emission and the corresponding storage time Int obtained in step S7.

$$Pr = Dt - Dt0 \times (Int/Int0) \quad (1)$$

In the following step S9, a decision is made as to whether or not the quantity of received light Pr attributable to the preliminary light emission alone calculated through formula (1) is greater than a predetermined value 10. In the embodiment, a guide number GN to be used to determine the flash output to be achieved in the main light emission is calculated by using the preliminary light emission quantity Pr. The predetermined value 10 is the lowest value which allows the guide number GN to be calculated by using the preliminary light emission quantity Pr. If an affirmative decision is made in step S9, the operation proceeds to step S13.

In step S13, the guide number GN for the main light emission is calculated. Namely, a flash light emission is executed so that the flash output matches the guide number GN calculated in step S13 during the photographing operation. The guide number GN can be calculated through formula (2) presented below by using the quantity of received light attributable to the preliminary light emission alone Pr which was calculated in step S8, the guide number GNp used in the preliminary light emission, the aperture value F0 set for the preliminary light emission, the aperture value F for the photographing operation and an adjustment value K.

$$GN = K \times GNp \times (F/F0) \times (1/Pr)^{0.5} \quad (2)$$

Since the preliminary light emission is executed in a non-photographing state in which the quick-return mirror 3 is lowered as shown in FIG. 1, the aperture 2 is in an open state during the preliminary light emission. For this reason, the aperture value F0 corresponding to the preliminary light emission is set to an open aperture value.

If, on the other hand, a negative decision is made in step S9, i.e., if the received preliminary light emission quantity Pr calculated in step S7 is equal to or smaller than the predetermined value 10 and thus is not large enough to allow an accurate guide number GN to be calculated, the operation proceeds to step S10.

In step S10, a decision is made as to whether or not the preliminary light emission executed in step S4 was a first preliminary light emission. If the preliminary light emission executed in step S4 was a first preliminary light emission and an affirmative decision is made accordingly in step S10, the operation proceeds to step S12. In step S12, the length of light emission period is set so as to match the flash output to be achieved in a preliminary light emission matches guide number GNp=8. Then, 200 μs, which corresponds to the light emission time length, is set for the length of storage time Int at the CCD sensor. Subsequently, the operation returns to step S3 to execute the processing in steps S3~S9 under the conditions set in step S12.

If an affirmative decision is made in step S9 with regard to the quantity of received light Pr attributable to the second preliminary light emission (Pr>10), the operation proceeds to step S13 to calculate the guide number GN for the main light emission through formula (2).

If, on the other hand, a negative decision is made in step S9 with regard to the second preliminary light emission, the operation proceeds to step S10 again to make a decision as to whether or not the most recent preliminary light emission was a first preliminary light emission. A negative decision is made in step S10 if the most recent preliminary light emission was the second preliminary light emission and, in such a case, the operation proceeds to step S11. Since the received preliminary light emission quantity Pr attributable to the second preliminary light emission is still lower than the predetermined value 10, the smallest value 10 necessary for calculating the guide number GN is set for the received preliminary light emission quantity Pr in step S11. Then, in step S13, the guide number GN for the main light emission is calculated through formula (2) by using the preliminary light emission quantity Pr=10 and the guide number GNp=8 for the preliminary light emission and the storage time Int=200 μs set in step S12.

The light reflected from the subject includes the reflected light resulting from a preliminary light emission and the reflected ambient light. By executing a preliminary light emission through a flash light emission with a high light emission intensity, i.e., through a single-shot light emission, and setting the light emission time length for the preliminary light emission roughly equal to the storage time Int at the CCD sensor 7, the ratio of the reflected ambient light can be relatively lowered.

Figure 5A:
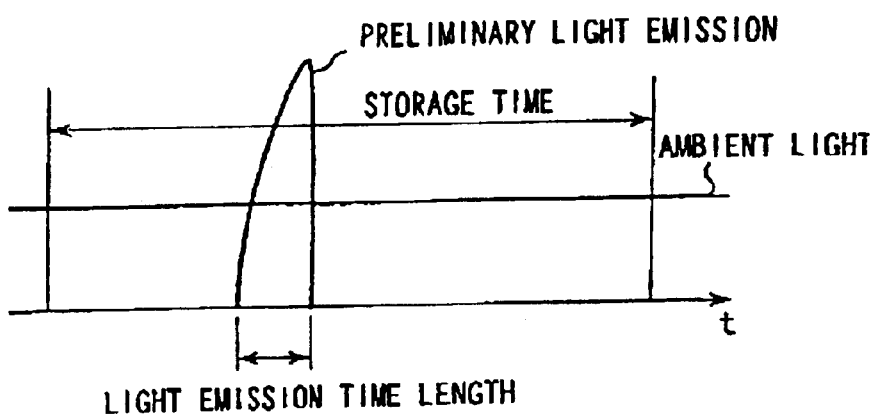
FIG. 5A schematically illustrates changes in the light emission intensity levels of the reflected ambient light and the reflected light resulting from a preliminary light emission.
Figure 5B:
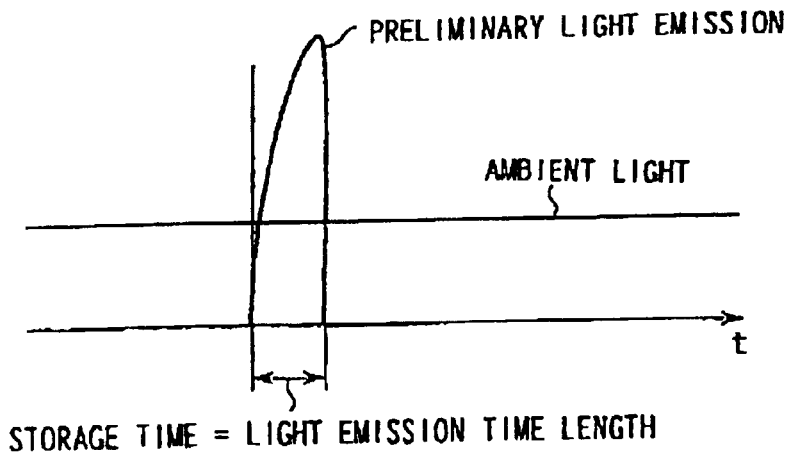
FIG. 5B schematically illustrates changes in the light emission intensity levels of the reflected ambient light and the reflected light resulting from a preliminary light emission.

FIGS. 5A and 5B schematically illustrate changes occurring in the light emission intensity of the reflected ambient light and the reflected light attributable to the preliminary light emission, both received by the CCD sensor 7. The area under each waveform indicates the received light quantity.

FIG. 5A shows changes occurring when the storage time Int is greater than the light emission time length. In this case, the ratio of the received light quantity corresponding to the ambient light is high.

FIG. 5B shows changes occurring when the storage time Int is set as in the embodiment. As shown in FIG. 5B, the storage time Int is substantially equal to the light emission time length and thus, the received light quantity attributable to the preliminary light emission is greater than the received light quantity corresponding to the ambient light. As a result, the reflected light attributable to the preliminary light emission can be detected with greater ease.

As described above, the preliminary light emission is executed through a single-shot light emission with a high light emission intensity level and the light reflected from the subject during the preliminary light emission is stored at the CCD sensor 7 and then is detected. Since the storage time Int over which electrical charges are stored at the CCD 7 is set equal to the preliminary light emission time, the extent to which the results of the subject light detection are affected by the ambient light can be reduced. Consequently, even when the intensity of the ambient light is high or when the distance to the subject is great, correct flash output for the main light emission, i.e., for the flash photographing operation, can be determined with a high degree of accuracy.

In addition, since the subject light is detected with the storage-type photometering sensor 7, the preliminary light emission can be achieved through a single-shot light emission. As a result, the power consumption can be reduced compared to that necessary in a focal plane light emission achieved by repeatedly turning on an electronic flash unit at high speed.

It is to be noted that while an explanation is given above in reference to the embodiment on an example in which the flash control is implemented when the shutter release switch SW 1 is turned on, the flash control processing shown in FIG. 4 can be executed in a similar manner when the switch SW 2 is turned on by pressing down the preliminary light emission button as well.

While the CCD sensor 7 is utilized as a storage-type photometering sensor in the embodiment, a storage-type image-capturing element such as a MOS image-capturing device may be employed, instead.

While the flash output achieved through the first preliminary light emission is set with the guide number GNp=2 and the corresponding storage time Int=50 μs at the CCD 7 and the flash output achieved through the second preliminary light emission is set with the guide number GNp=8 and the corresponding storage time Int=200 μs in the embodiment described above, the present invention is not restricted by these setting details as long as the flash output achieved through the second preliminary light emission is greater than the quantity of light emitted through the first preliminary light emission. In addition, while the lowest value for the received preliminary light emission quantity Pr is set at 10, it may be set at another value as long as the guide number GN for the main light emission can be calculated with accuracy.

It is to be noted that while three or more preliminary light emissions may each be executed through a single-shot light emission if the second preliminary light emission quantity Pr is equal to or smaller than the predetermined value, it is more preferable to limit the number of preliminary light emissions to two at the most.

While some of the subject light guided to the view finder optical system 6 is detected at the CCD sensor 7 in the embodiment explained above, the present invention is not limited to this example. For instance, a halt mirror may be provided behind the quick-return mirror 3, at the side toward the film surface 9, to guide some of the light having passed through the photographic lens 1 to the CCD sensor with the half mirror. In such a case, a preliminary light emission is executed in a photographing state in which the quick-return mirror 3 is set at the raised position and thus, the aperture 2 is set at the photographing aperture value during the preliminary light emission. For this reason, it is necessary to set the aperture 2 at the photographing aperture value when ascertaining the received ambient light quantity as well. In contrast, the preliminary light emission is executed while the quick-return mirror 3 is in a lowered state and the aperture 2 is in an open state and thus, the received ambient light quantity Dt0 which is ascertained in advance can be used for the calculation of the received preliminary light emission quantity.

Furthermore, while an explanation is given above in reference to the embodiment in which the present invention is adopted in a silver halide camera, the present invention may also be adopted in a digital still camera that implements flash control by executing a preliminary light emission prior to a main light emission.

What is claimed is:

1. A camera comprising:
    a storage-type photometering sensor that detects some of light from a subject;
    a control device that controls an auxiliary illumination device so as to perform a preliminary light emission through a single-shot light emission and controls the storage-type photometering sensor so as to detect the subject light stored over a storage period matching a length of time over which light is emitted during the preliminary light emission;
    a setting device that sets a light emission condition under which the auxiliary illumination device is to emit light during a flash photographing operation based upon detection results obtained at the storage-type photometering sensor; and
    a decision-making device that makes a decision whether a detection value obtained at the storage-type photometering sensor through the preliminary light emission is equal to or smaller than a predetermined value, wherein:
    if the detection value is determined to be equal to or smaller than the predetermined value by the decision-making device,
        (a) the control device controls the auxiliary illumination device so as to execute an additional preliminary light emission with a greater flash output than in the preliminary light emission and controls the storage-type photometering sensor so as to detect subject light stored over a storage time matching a length of time over which light is emitted during the additional preliminary light emission and
        (b) the setting device sets the light emission condition under which the auxiliary illumination device is to emit light for the flash photographing operation based upon detection results obtained at the storage-type photometering sensor during the addition preliminary light emission.

2. A camera according to claim 1, wherein:
    the detection value obtained at the storage-type photometering sensor represents a received light quantity with regard to reflected light from the subject attributable to the light emitted through the preliminary light emission.

3. A camera according to claim 2, wherein:
    the received light quantity with regard to the reflected light from the subject attributable to the light emitted through the preliminary light emission is obtained by eliminating reflected light from the subject attributable to ambient light from the detection results obtained at the storage-type photometering sensor.

4. A camera according to claim 1, wherein:
    the setting device sets the light emission condition under which the auxiliary illumination device is to emit light during the flash photographing operation based upon the predetermined value if the detection value obtained by the storage-type photometering sensor through the additional preliminary light emission is determined to be equal to or smaller than the predetermined value by the decision-making device.

5. A camera according to claim 1, wherein:
the setting device allows the auxiliary illumination device to execute the preliminary light emission when a shutter release switch is pressed.

6. A camera according to claim 1, further comprising:
a command switch that outputs a command for an execution of the preliminary light emission, wherein:
   the setting device allows the auxiliary illumination device to execute the preliminary light emission when the command is output through the command switch.

7. A camera according to claim 1, wherein:
the storage-type photometering sensor detects some of the subject light guided to a viewfinder optical system.

8. A camera comprising:
a storage-type photometering sensor that detects some of light from a subject;
an auxiliary illumination device that illuminates the subject;
a control device that controls the auxiliary illumination device so as to perform a preliminary light emission through a single-shot light emission and controls the storage-type photometering sensor so as to detect the subject light stored over a storage period set equal to or matching a length of time over which light is emitted during the preliminary light emission;
a setting device that sets a light emission condition under which the auxiliary illumination device is to emit light during a flash photographing operation based upon detection results obtained at the storage-type photometering sensor; and
a decision-making device that makes a decision whether a detection value obtained at the storage-type photometering sensor through the preliminary light emission is equal to or smaller than a predetermined value, wherein:
if the detection value is determined to be equal to or smaller than the predetermined value by the decision-making device,
  (a) the control device controls the auxiliary illumination device so as to execute an additional preliminary light emission with a greater flash output than in the preliminary light emission and controls the storage-type photometering sensor so as to detect the subject light stored over a storage time matching a length of time over which light is emitted during the additional preliminary light emission and
  (b) the setting device sets the light emission condition under which the auxiliary illumination device is to emit light for the flash photographing operation based upon detection results obtained at the storage-type photometering sensor during the additional preliminary light emission.

* * * * *